(12) United States Patent
Hanna et al.

(10) Patent No.: US 9,027,718 B2
(45) Date of Patent: May 12, 2015

(54) LIGHT-WEIGHT AND SOUND-DAMPED BRAKE ROTOR AND METHOD OF MANUFACTURING THE SAME

(75) Inventors: Michael D. Hanna, West Bloomfield, MI (US); Mark T. Riefe, Brighton, MI (US); Mohan Sundar, Troy, MI (US); Brent D. Lowe, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 367 days.

(21) Appl. No.: 13/222,052

(22) Filed: Aug. 31, 2011

(65) Prior Publication Data

US 2013/0048448 A1    Feb. 28, 2013

(51) Int. Cl.
*F16D 65/12*     (2006.01)
*F16D 65/00*     (2006.01)
*F16D 65/02*     (2006.01)

(52) U.S. Cl.
CPC ............ *F16D 65/0006* (2013.01); *F16D 65/12* (2013.01); *F16D 2065/1316* (2013.01); *F16D 2065/1328* (2013.01); *F16D 2065/1344* (2013.01); *F16D 2065/1356* (2013.01); *F16D 2200/0013* (2013.01); *F16D 2200/0021* (2013.01)

(58) Field of Classification Search
CPC ................ F16D 65/0006; F16D 65/12; F16D 2065/1316; F16D 2065/1328; F16D 2065/1344; F16D 2065/1356; F16D 2200/0013; F16D 2200/0021
USPC ........... 188/218 XL, 218 R, 381, 248, 250 B, 188/250 E, 250 H, 251 M, 251 A; 164/75
See application file for complete search history.

(56) References Cited

U.S. PATENT DOCUMENTS

| 4,436,139 | A  | * | 3/1984  | Strader ........................... 164/112 |
| 4,930,606 | A  | * | 6/1990  | Sporzynski et al. ..... 188/218 XL |
| 5,385,216 | A  | * | 1/1995  | Kulczycki .................... 188/70 R |
| 5,862,892 | A  | * | 1/1999  | Conley ..................... 188/218 XL |
| 6,241,055 | B1 | * | 6/2001  | Daudi ......................... 188/73.35 |
| 6,267,209 | B1 | * | 7/2001  | Gross et al. ............. 188/218 XL |
| 7,594,568 | B2 |   | 9/2009  | Hanna et al. |
| 7,644,750 | B2 |   | 1/2010  | Schroth et al. |
| 7,775,332 | B2 |   | 8/2010  | Hanna et al. |
| 7,937,819 | B2 |   | 5/2011  | Hanna et al. |

(Continued)

OTHER PUBLICATIONS

U.S. Appl. No. 13/292,158, filed Nov. 9, 2011; First Named Inventor: Michael D. Hanna; Title: Light-Weight and Sound-Damped Brake Rotor and Method of Manufacturing the Same.

*Primary Examiner* — Anna Momper
*Assistant Examiner* — San Aung
(74) *Attorney, Agent, or Firm* — Reising Ethington P.C.

(57) ABSTRACT

A light-weight, sound-damped, composite brake rotor for a vehicle braking system includes a rotor hat and an annular rotor cheek supported by, and cast around, the rotor hat. The rotor hat includes an axially-protruding central hub and an integral flange that extends radially from and circumferentially around the central hub. The rotor cheek includes a top ledge and a bottom ledge that overly a top annular surface and a bottom annular surface, respectively, of the integral flange. An annular interfacial boundary present between an underside of the top and/or bottom ledges and their respective adjacent annular surfaces of the integral flange includes a vibration damping interface. The brake rotor derives its vibration-deadening and sound-damping effects from the vibration damping interface through the occurrence of relative frictional contacting movement.

18 Claims, 5 Drawing Sheets

(56) References Cited

U.S. PATENT DOCUMENTS

| | | |
|---|---|---|
| 7,938,378 B2 | 5/2011 | Hanna et al. |
| 7,950,441 B2 | 5/2011 | Hanna et al. |
| 7,975,750 B2 | 7/2011 | Dessouki et al. |
| 8,028,739 B2 | 10/2011 | Walker et al. |
| 8,056,233 B2 | 11/2011 | Carter et al. |
| 2002/0104721 A1* | 8/2002 | Schaus et al. ........... 188/218 XL |
| 2007/0062768 A1* | 3/2007 | Hanna et al. ............ 188/218 XL |
| 2008/0099289 A1 | 5/2008 | Hanna et al. |
| 2008/0185249 A1 | 8/2008 | Schroth et al. |
| 2009/0020383 A1 | 1/2009 | Hanna et al. |
| 2009/0022938 A1 | 1/2009 | Hanna et al. |
| 2009/0032211 A1 | 2/2009 | Hanna et al. |
| 2009/0044923 A1* | 2/2009 | Hanna et al. ..................... 164/15 |
| 2009/0260931 A1 | 10/2009 | Ulicny et al. |
| 2009/0260932 A1 | 10/2009 | Hanna et al. |
| 2009/0260939 A1 | 10/2009 | Golden et al. |
| 2009/0269575 A1 | 10/2009 | Hanna et al. |
| 2010/0122880 A1 | 5/2010 | Hanna et al. |
| 2010/0206675 A1* | 8/2010 | Miyake et al. .......... 188/218 XL |
| 2010/0263970 A1* | 10/2010 | Botsch et al. .......... 188/218 XL |
| 2010/0282550 A1* | 11/2010 | Schroth et al. .......... 188/218 XL |
| 2011/0278116 A1* | 11/2011 | Lembach et al. ....... 188/218 XL |

\* cited by examiner

LIGHT-WEIGHT AND SOUND-DAMPED BRAKE ROTOR AND METHOD OF MANUFACTURING THE SAME

TECHNICAL FIELD

The technical field of this disclosure relates generally to a light-weight, sound-damped brake rotor for a vehicle braking system. The brake rotor includes an annular rotor cheek cast around an integral flange extending radially from and circumferentially around a central hub of a rotor hat. Located beneath an axially-oriented braking surface or surfaces provided by the rotor cheek is a vibration damping interface that damps vibration propagation through the brake rotor during a braking event. A method for making the light-weight and sound-damped brake rotor is also disclosed.

BACKGROUND

A motor vehicle braking system typically includes a brake rotor (sometimes called a disc brake rotor) at one or more wheels of the vehicle. The brake rotor generally includes a rotor hat and a rotor cheek. The rotor hat is coupled to a rotatable axle to permit the brake rotor to co-rotate with the wheel when the vehicle is moving. The rotor cheek is an annular segment of the brake rotor that surrounds the rotor hat and includes at least one braking surface against which a brake pad is selectively applied when braking is desired. A pair of mutually opposed braking surfaces are typically present on each side of the rotor cheek to provide better braking capabilities through the selective clamping or gripping of opposed brake pads. Several different rotor cheek configurations have been designed. The rotor cheek may, for example, be solid or it may define a web of ventilation vanes to help dissipate heat generated at the braking surface(s).

The brake pad(s) are normally carried by a brake caliper in close proximity to the braking surface(s). The brake caliper is supported near the brake rotor by a caliper mounting bracket that is attached to an axle hub, a steering knuckle, or some other local stationary section of the vehicle. A typical structural configuration of the brake caliper allows the brake pad(s) to be selectively applied against the braking surface(s) of the rotor cheek by way of a mechanic, hydraulic, pneumatic, or electromagnetic braking response mechanism actuated by depressing a brake pedal located in the driver compartment beneath the steering column. The resultant frictional interaction between the rotating rotor cheek and the non-rotating brake pad(s) decreases the rotational speed of the wheel. The rate at which the rotational speed of the wheel decelerates is dependent on the pressure applied by the brake pad(s).

Sometimes the application of the brake pad(s) against the braking surface(s) causes undesirable vibrations to resonate through the brake rotor, the brake caliper, or both. These vibrations may be felt and heard by the passengers present in the vehicle. High frequency vibrations in the range of about 1,000 Hz to about 18,000 Hz, for example, are often associated with a noise referred to as brake squeal while low frequency vibrations below about 1,000 Hz are often associated with a variety of noises such as brake groan, moan, and howl. Any of these noises may be considered an actual or perceived driving disturbance if produced on a regular basis. The development of a light-weight brake rotor that disrupts vibration propagation during braking and, as a result, substantially subdues noise transmission, would be a welcome contribution to the vehicle braking art along with a method of manufacturing such a sound-damped brake rotor.

SUMMARY OF THE DISCLOSURE

A light-weight, sound-damped, composite brake rotor includes a rotor hat and an annular rotor cheek supported by, and cast around, the rotor hat. Both of the rotor hat and the annular rotor cheek are centered about a longitudinal axis. The rotor hat is made of steel and includes an axially-protruding central hub and an integral flange that extends radially from and circumferentially around the central hub. The rotor cheek is made of cast iron and includes a top ledge and a bottom ledge. The top ledge overlies a top annular surface of the integral flange and the bottom ledge overlies a bottom annular surface of the integral flange. At least one of the top ledge and the bottom ledge, and usually both ledges, provides an axially-oriented braking surface against which closely-situated brake pads carried on a brake caliper can be selectively applied to effectuate braking. Located underneath the braking surface of the top and/or bottom ledge on the top annular surface, the bottom annular surface, or both surfaces of the integral flange is a peripheral radial segment that may include a non-wettable coating. This coating is a friction-enhancing, high-temperature resistant coating which is non-wettable in the sense that it resists sticking or bonding to the solidifying rotor cheek during casting.

An annular interfacial boundary present between an underside of the top and/or bottom ledges and their respective adjacent annular surfaces of the integral flange includes a vibration damping interface. The vibration damping interface is present where the top and/or bottom ledges overlies the non-wettable coating applied to the peripheral radial segment. Because the non-wettable coating obstructs bonding or metallurgical fusion during casting of the rotor cheek around the integral flange, the vibration damping interface can experience relative frictional contacting movement when the brake pad(s) engages the top and/or bottom braking surfaces and imparts vibrations to the rotor cheek. Such relative interfacial frictional movement converts mechanical vibratory energy to thermal energy which, in turn, disrupts vibration propagation and substantially lessens any associated noise transmission from the brake rotor. All or part of the peripheral radial segment may be covered by the top and/or bottom ledges depending on how the rotor cheek is supported on the rotor hat.

A first exemplary embodiment of the sound-damped brake rotor includes a solid, unitary rotor cheek in which the top ledge and the bottom ledge transition around a constant-radius edge surface of the integral flange. The annular interfacial boundary between the integral flange and the top and/or bottom ledge contains a bonded interface radially inward of the vibration damping interface. The bonded interface is a metallurgically fused interfacial joint between the underside of the top and/or bottom ledge and the top and/or bottom annular surface, respectively, of the integral flange that secures the rotor cheek to the rotor hat. This joint prevents the rotor cheek from independently rotating relative to the rotor hat when the brake pad(s) is pressed against the top and/or bottom braking surfaces during braking. The bonded interface is formed when the molten cast iron used to cast the rotor cheek contacts the top and/or bottom annular surfaces of the integral flange radially inward of the non-wettable coating, if present, and metallurgical fusion occurs between the two metallic surfaces.

A second exemplary embodiment of the light-weight, sound-damped brake rotor includes mechanical locking features in addition to, or as a substitute for, the bonded interface between the integral flange and the rotor cheek. The mechanical locking features help support the rotor cheek on the rotor hat and prevent relative independent rotational movement between those two components when the brake pad(s) is pressed against the top and/or bottom braking surfaces during braking. A couple examples of such mechanical locking features are (1) an edge surface of the integral flange that exhibits a variable radius and (2) a plurality of holes that are circumferentially spaced around the peripheral radial segment and receive studs which integrally join the top ledge and the bottom ledge through the integral flange. If one or both of these mechanical locking features are present, the top and/or bottom ledges do not need to completely cover the non-wettable coating applied to the peripheral radial segment, if desired, since the bonded interface is no longer needed to affix the rotor cheek to the rotor hat.

A third exemplary embodiment of the sound-damped brake rotor includes a rotor cheek in which the top ledge is vented, the bottom ledge is vented, or both ledges are vented. The vented ledge includes a plurality of partitions that are circumferentially spaced around the rotor cheek between the annular interfacial boundary (the boundary between the underside of the ledge and the annular surface of the integral flange) and the axially-oriented braking surface. The partitions define a plurality of vanes that extend radially inwardly form an open, circumferential vane access channel at a transverse cheek edge surface of the rotor cheek either partly or all the way through the ledge. The vented ledge gives the annular rotor cheek enhanced heat dissipation capabilities by permitting the centrifugal expulsion of heated air from the rotor cheek during braking. A fourth exemplary embodiment of the sound-damped brake rotor includes at least one such vented ledge in combination with the mechanical locking features of the second exemplary embodiment.

A manufacturing method that can be employed to make any of the sound damped brake rotors includes a rotor hat forming step, a non-wettable coating application step, and a rotor cheek casting step. The rotor hat forming step involves forming the rotor hat, for example, in a stamping press from a thin steel sheet of suitable size and thickness. The non-wettable coating application step involves applying a non-wettable coating composition to the peripheral radial segment of the top annular surface, the bottom annular surface, or both, of the integral flange after the rotor hat as been formed. And finally, the rotor cheek casting step involves casting the rotor cheek from a molten cast iron charge around the integral flange of the rotor hat and over the non-wettable coating applied at the peripheral radial segment. Other manufacturing steps may be performed either before, during, or after these three steps as is generally understood by skilled artisans. The differences between the various brake rotor embodiments can be easily accommodated by modifying the rotor hat forming step and/or the rotor cheek casting step.

DETAILED DESCRIPTION OF PREFERRED EMBODIMENTS

Several embodiments of a light weight, sound-damped, composite brake rotor for a vehicle braking system are shown in FIGS. 1-4. Each of these brake rotors includes an annular rotor cheek, which may be solid or vented, cast around a centrally-located rotor hat. The annular rotor cheek provides at least one braking surface against which a selectively applied brake pad is pressed during braking. Located within the annular rotor cheek beneath the braking surface is a vibration damping interface that may continuously span the entire circumference of the annular rotor cheek or be intermittently present. The vibration damping interface is a physically distinct surface-to-surface interface where relative frictional contacting movement can occur when the brake pad is applied against the braking surface. Such frictional interactions convert mechanical vibratory energy into dissipating thermal energy and ultimately weaken the proliferation of vibrations and their ability to sustain a disruptive, audible noise. A method for manufacturing the several disclosed brake rotors is also shown diagrammatically in FIGS. 5-11.

Figure 1:
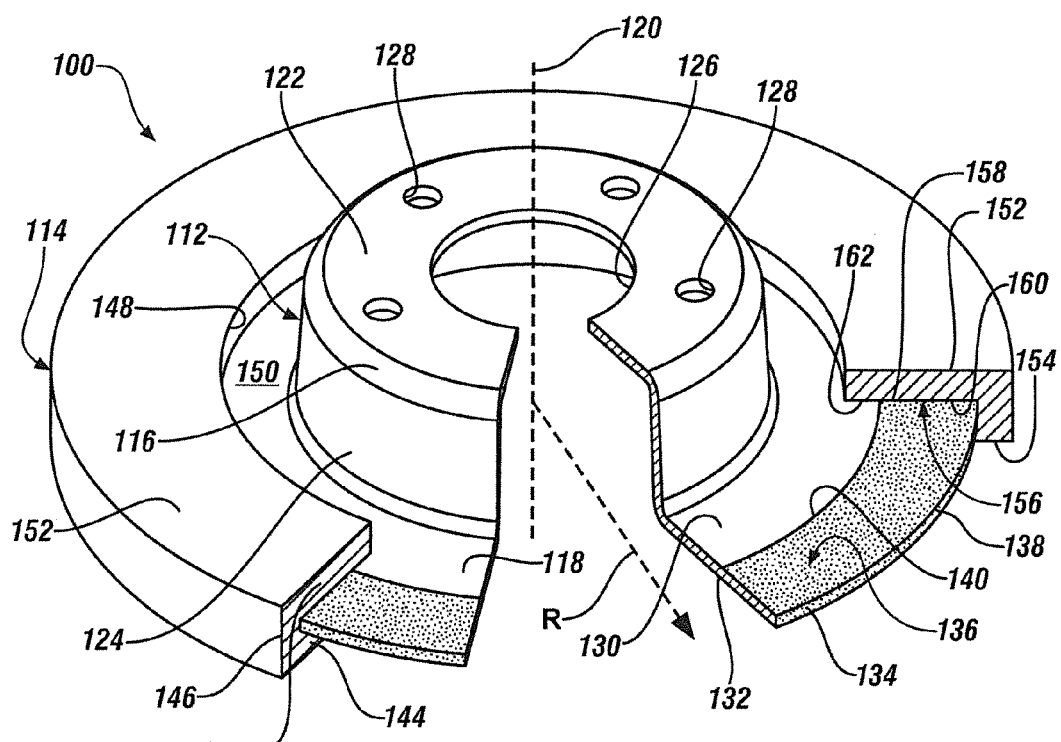
FIG. 1 is a perspective, partially cut-away view of a sound-damped brake rotor according to one embodiment of the invention.

FIG. 1 illustrates a brake rotor 100 according to one particular design. The brake rotor 100 includes two main components—a rotor hat 112 and an annular rotor cheek 114. When used as part of a vehicle braking system, the brake rotor 100 is usually mounted to a rotatable axle on an inward-facing side of the wheel within a rim that supports an inflatable tire. The brake rotor 100 co-rotates with the wheel while the vehicle is moving. A driver of the vehicle can selectively slow the rotation of the wheel at a desired pace by actuating a brake caliper located in close proximity to the brake rotor 100. The brake caliper can be of the fixed or floating type and, in general, carries one or more brake pads that can frictionally engage the rotor cheek 114 by a mechanic, hydraulic, pneumatic, or electromagnetic braking response mechanism. The force of the frictional engagement applied by the brake caliper is generally controlled by the pressure applied to a depressable foot pedal located underneath a steering column in a driver compartment of the vehicle.

The rotor hat 112 includes an axially-protruding central hub 116 and an integral flange 118 that extends radially from and circumferentially around the central hub 116. Each of the central hub 116 and the integral flange 118 is centered about a central longitudinal axis 120. The rotor hat 112 is preferably constructed from a steel composition that can withstand the frictional stresses and associated heat repeatedly encountered during braking. A wide variety of steels are available in sheet form and may be used to form the rotor hat 112 including low carbon steels (1008 low carbon steel), mild carbon steels (1018 mild carbon steel), alloy steels (945 high-strength low-alloy steel), and stainless steels (304 and 316 stainless steel), to name but a few examples. Steel compositions such as these are strong, heat resistant, and amenable to bonding which allows the annular rotor cheek 114 to be separately cast around the rotor hat 112.

The central hub 116 has a top face 122 that is axially displaced from the integral flange 118 and a side wall 124 that appends the top face 122 and the integral flange 118. A bore 126 and a plurality of bolt holes 128 are defined by the top face 122 to facilitate attachment of the brake rotor 100 to a wheel hub (not shown). The bore 126 is centered on the same longitudinal axis 120 as the central hub 116. The plurality of bolt holes 128 are circumferentially spaced around the bore 126. When the rotor hat 112 is mounted onto the wheel hub, the bore 126 receives a correspondingly-sized central projection of the wheel hub and the plurality of bolt holes 128 each receive a wheel stud or bolt. The wheel studs or bolts are also received by bolt holes in the wheel rim and are then capped by threaded lug nuts to affix the wheel to the wheel hub over the brake rotor 100.

The integral flange 118 includes a top annular surface 130, a bottom annular surface 132, and an edge surface 134 that connects the top annular surface 130 and the bottom annular surface 132 across a thickness of the integral flange 118. The two annular surfaces 130, 132 are preferably flat, as shown, but do not have to be as surface features such as, for example, one or more raised concentric ridges encircling the central hub 116 may be present. The edge surface 134 defines the circumferential profile of the top and bottom annular surfaces 130, 132 and, in this particular embodiment, maintains a constant radius R about the longitudinal axis 120 of the central hub 116 and the integral flange 118. A main function of the integral flange 118 is to provide a base construct upon which the annular rotor cheek 114 can be cast. Some or all of the top and bottom annular surfaces 130, 132 are intended to be covered by the annular rotor cheek 114.

The top annular surface 130 or the bottom annular surface 132, or both, includes a peripheral radial segment 136 that contains a surface-applied non-wettable coating. The edge surface 134 may also include this coating if desired. The peripheral radial segment 136 is an annular portion of the top and/or bottom annular surfaces 130, 132 that extends radially between an outer circumferential border 138, which in this embodiment coincides with the edge surface 134, and an inner circumferential border 140. There is no requirement that the peripheral radial segment 136 on the top and bottom surfaces 130, 132, if present on both, correspond with one another but they usually do for the sake of manufacturing simplicity. Exactly what pattern the non-wettable coating assumes when applied to the peripheral radial segment 136 is subject to some variation. The peripheral radial segment 136 may be continuously coated with the non-wettable coating or, alternatively, the peripheral radial segment 136 may be intermittently coated. A generally suitable thickness for the non-wettable coating ranges anywhere from about 1 μm to about 400 μm, more preferably from about 30 μm to about 250 μm, and most preferably from about 75 μm to about 150 μm.

The non-wettable coating is derived from any coating composition that, when formed, can resist melting during casting of the annular rotor cheek 114 around the rotor hat 112. This kind of heat-resistance ensures the coated portions of the peripheral radial segment 136 do not become metallurgically fused to the annular rotor cheek 114. The non-wettable coating preferably includes a refractory material component dispersed in a binder. The refractory component may, for example, include regular or irregularly shaped particles and/or fibers of at least one of graphite, alumina ($Al_2O_3$), silica ($SiO_2$), magnesia (MgO), calcium oxide (CaO), titanic ($TiO_2$), ceria ($CeO_2$), zirconia ($ZrO_2$), cordierite (a Mg/Fe/Al silicate), mullite (an aluminum silicate), sillimanite (an aluminum silicate), spodumene (a lithium aluminum silicate), petalite (a lithium aluminum silicate), zircon ($ZrSiO_4$), silicon carbide (SiC), titanium carbide (TiC), boron carbide ($B_4C$), hafnium carbide (HfC), silicon nitride ($Si_3N_4$), titanium nitride (TiN), titanium boride ($TiB_2$), vermiculite (a phyllosilicate), kaolinite (a phyllosilicate), muscovite (a phyllosilicate), or a fire clay, to name but a few. The binder that holds the refractory component in place and bonds them to the peripheral radial segment 136 of the integral flange 118 may be any sufficiently heat-resistant binding composition such as, for example, an epoxy resin, a vinyl ester resin, a lignosulfonate binder, a calcium aluminate cement, or a wood flour cement (polyoxybenzyl methylene gylcol anhydride with a wood flour filler).

The annular rotor cheek 114 is supported by the internal flange 118 and concentrically surrounds the central hub 116 about the longitudinal axis 120. The annular rotor cheek 114 is a solid and generally U-shaped unitary piece that includes a top ledge 142 that overlies the top annular surface 130 and a bottom ledge 144 that overlies the bottom annular surface 132. The top and bottom ledges 142, 144 further transition around the edge surface 134 of the integral flange 118 and, together, provide a transverse cheek edge surface 146 that defines a circumference and radius of the annular rotor cheek 114. Each of the top and bottom ledges 142, 144 extends radially inwardly from the transverse cheek edge surface 146 and terminates at a top inner circumferential edge surface 148 and a bottom inner circumferential edge surface (not shown), respectively, such that the non-wettable coating applied to the peripheral radial segment 136 is completely covered by the top and/or bottom ledges 142, 144. The top inner circumferential edge surface 148 preferably defines an annular gap 150 with the side wall 124 of the central hub 116 for weight reduction purposes but, if desired, may extend all the way to the central hub 116 and abut the side wall 124. The bottom inner circumferential edge surface, although not explicitly shown in FIG. 1, preferably mirrors the location of the top inner circumferential edge surface 148. Any type of cast iron may be used to fabricate the annular rotor cheek 114 with grey cast iron being the most preferred.

The top and bottom ledges 142, 144 provide an axially-oriented top braking surface 152 and an oppositely facing bottom braking surface 154, respectively. These braking surfaces 152, 154 are meant to experience pressed frictional engagement with the proximally-located brake pads carried by the brake caliper during braking of the vehicle. Located beneath the top braking surface 152 is a top annular interfacial boundary 156 between an underside 158 the top ledge 142 and the top annular surface 130. A similar annular interfacial boundary is present beneath the bottom braking surface 154 although not explicitly shown. At least one of the top annular interfacial boundary 156 or the bottom annular interfacial boundary includes a vibration damping interface 160 (shown here at the top annular interfacial boundary). The vibration damping interface 160 is formed between the underside 158 of the top ledge 142 (and/or the underside of the bottom ledge 144) and the non-wettable coating applied at the peripheral radial segment 136. At least one of the top annular interfacial boundary 156 or the bottom annular interfacial boundary further includes a bonded interface 162. The bonded interface 162 is formed between the underside 158 of the top ledge 142 (and/or the underside of the bottom ledge 144) and the top annular surface 130 (and/or the bottom annular surface 132) inward of the peripheral radial segment 136, if present, where the non-wettable coating has not been applied.

The vibration damping interface 160 provides the brake rotor 100 with its vibration-deadening and sound-damping effects. The non-wettable coating prevents the underside 158 of the top ledge 142 (and/or the underside of the bottom ledge 144) from fusing to the peripheral radial segment 136 of the top annular surface 130 (and/or the bottom annular surface 132) when the rotor cheek 114 is cast around the integral flange 118. Relative frictional contacting movement is therefore able to transpire between the non-wettable coating and the underside 158 of the top ledge 142 (and/or the underside of the bottom ledge 144) when the brake pads engage the top and/or bottom braking surfaces 152, 154 and impart vibrations to the annular rotor cheek 114. Such relative interfacial frictional movement converts mechanical vibratory energy to thermal energy which, in turn, disrupts vibration propagation and substantially lessens any associated noise transmission. The bonded interface 162, on the other hand, is a metallurgically fused interfacial joint that secures the rotor cheek 114 to the rotor hat 112. This joint prevents the rotor cheek 114 from independently rotating relative to the rotor hat 112 when the brake pads are pressed against the top and bottom braking surfaces 152, 154 during braking.

The size of the brake rotor 100 can vary depending on the particular vehicle application. A typical construction of the brake rotor 100 is usually defined by the dimensions set forth below in Table 1.

TABLE 1

Brake Rotor Size Dimensions

| Brake Rotor Dimension | Size Range |
| --- | --- |
| Rotor Hat | |
| Diameter of central hub 116 | 300-700 mm |
| Height of side wall 124 (i.e., axial displacement of the top face 122 from the integral flange 118) | 150-700 mm |
| Radial dimension of the integral flange 118 that extends from the side wall 124 of the central hub 116 to the edge surface 134 | 200-1200 mm |
| Radial dimension of the peripheral radial segment 136 extending between the outer circumferential border 138 and the inner circumferential border 140 | 100 mm-1200 mm |
| Height of the edge surface 134 (i.e., thickness of the integral flange 118) | 0.5-6 mm |
| Thickness of the non-wettabel coating | 1-400 µm |
| Rotor Cheek | |
| Radial dimension of the top/bottom braking surfaces 152, 154 extending from the top/bottom inner circumferential edge surface to the transverse cheek edge Surface 146 | 600-2000 mm |
| Radial dimension of the annular gap 150 between the side wall 124 of the central hub 116 and the top inner circumferential edge surface 148 | 0-300 mm |
| Thickness of the top/bottom ledge 142, 144 from the underside of the ledge 142, 144 to the braking surface 152, 154 | 300-800 mm |
| Radial dimension of the bonded interface 162 extending from the top/bottom inner circumferential edge surface to the vibration damping interface 160 | 5-30 mm |
| Radial dimension of the vibration damping interface 160 | 100 mm-1200 mm |

Figure 2:
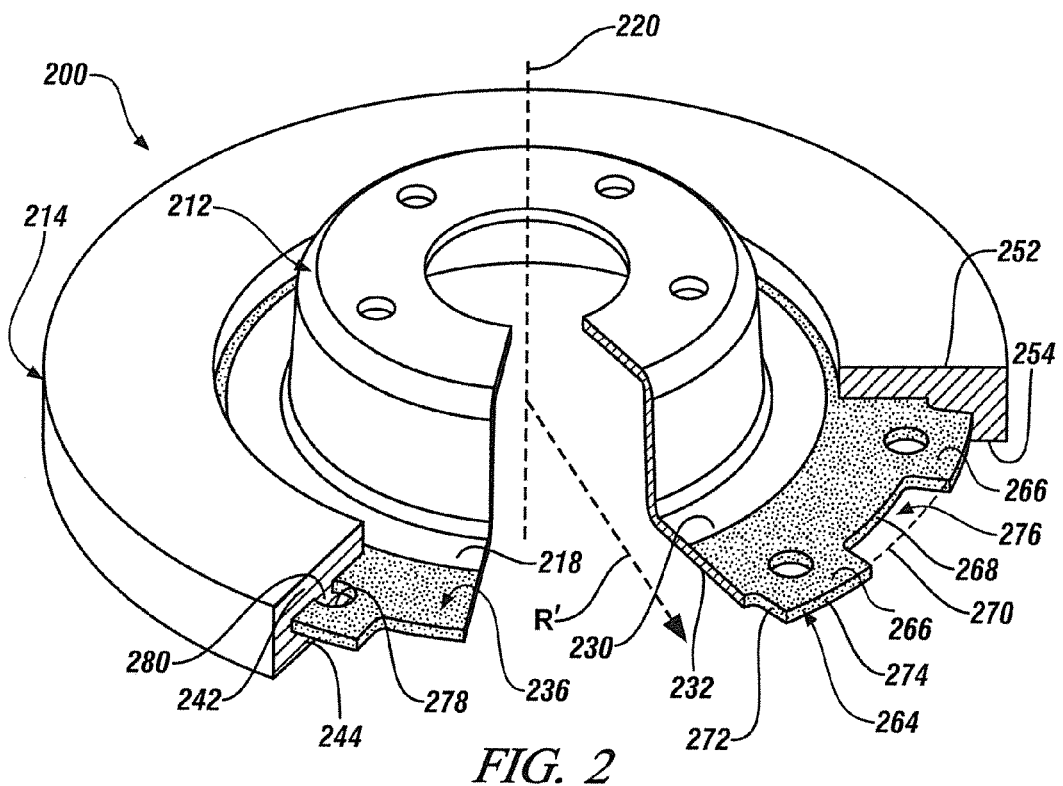
FIG. 2 is a perspective, partially cut-away view of a sound-damped brake rotor according to another embodiment of the invention in which mechanical locking features are present to secure the annular rotor cheek to the rotor hat.

FIG. 2 illustrates a brake rotor 200 according to another particular design. Many aspects of this particular brake rotor 200 are the same as those of the previously-described brake rotor 100. Those same aspects are designated by like numerals and are not described in any further detail. Only the structural and functional variations embraced by the brake rotor 200 of this embodiment are discussed. Specifically, the brake rotor 200 shown here includes several mechanical locking features that help support the rotor cheek 214 on the rotor hat 212 and prevent relative independent rotational movement between those two components when the brake pads are pressed against the top and/or bottom braking surfaces 252, 254 during braking. The presence of these mechanical locking features obviates the need to provide a bonded interface (162 in FIG. 1) radially inward from the vibration damping interface. That is, the peripheral radial segment 236 does not have to be completely covered by the top and/or bottom ledges 242, 244.

One of the mechanical locking features incorporated into the brake rotor 200 is an edge surface 264 of the integral flange 218 that exhibits a variable radius R' about the longitudinal axis 220. The variable radius R' of the edge surface 264 may be achieved by a plurality of tabs 266 which extend radially outwardly from a nominal edge surface 268 of the integral flange 218 to an extended edge surface 270. The tabs 266 may be defined by a pair of side edge surfaces 272, which extend radially outwardly from the nominal edge surface 268, and a top edge surface 274 that connects the pair of side edge surfaces 272 and coincides with the extended edge surface 270. An intervening space 276 located between adjacent tabs 266 receives a corresponding portion of the annular rotor cheek 214 and confines the plurality of tabs 266 to a fixed location. The confinement of the plurality of tabs 266 helps prevent relative independent rotational movement between the rotor hat 212 and the annular rotor cheek 214 during braking. Other radially extending profiles for the tabs 266 besides the one shown here may be employed such as, for example, semi-circular, triangular, and sinusoidal, and still achieve similar results.

Another mechanical locking feature incorporated into the brake rotor 200 is a plurality of holes 278 that are circumferentially spaced around the peripheral radial segment 236 and extend through the integral flange 218 from the top annular surface 230 to the bottom annular surface 232. The plurality of holes 278 may be located within the tabs 266, inside the nominal edge surface 268 adjacent to the tabs 266, or offset from the tabs 266 depending on the strength requirements of the integral flange 218. Each of the holes 278 receives a stud 280 that integrally joins the top ledge 242 and the bottom ledge 244 across the thickness of the integral flange 218. These studs 280 are formed during casting of the annular rotor cheek 214. And their extension through the integral flange 218 helps impede relative independent rotational movement between the rotor hat 212 and the annular rotor cheek 214 during braking.

Figure 3:
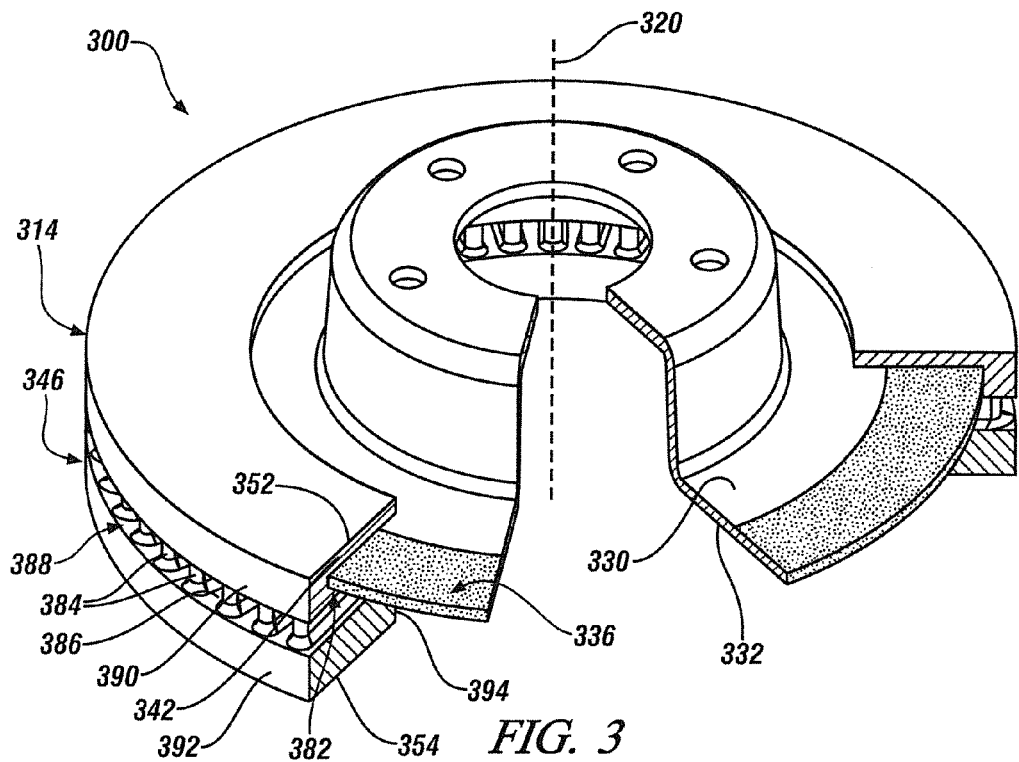
FIG. 3 is a perspective, partially cut-away view of a sound-damped brake rotor according to yet another embodiment of the invention in which a vented ledge forms part of the annular rotor cheek.

FIG. 3 illustrates a brake rotor 300 according to yet another particular design. Many aspects of this particular brake rotor 300 are the same as those of the first-described brake rotor 100. Those same aspects are designated by like numerals and are not described in any further detail. Only the structural and functional variations embraced by the brake rotor 300 of this embodiment are discussed. Specifically, the brake rotor 300 shown here includes an annular rotor cheek 314 having a vented bottom ledge 382. The vented bottom ledge 382 gives the annular rotor cheek 314 enhanced heat dissipation capabilities by permitting the centrifugal expulsion of heated air during braking. It should be understood that the brake rotor 300 could include a vented top ledge (not shown) instead of the vented bottom ledge 382 or that both ledges could be vented despite what is explicitly shown in FIG. 3.

The vented bottom ledge 382 is thicker than the top ledge 342 along the longitudinal axis 320 and includes a plurality of internal partitions 384 that define radially extending vanes 386. The partitions 384 are circumferentially spaced around the rotor cheek 314 between a bottom annular interfacial boundary (the boundary between an underside of the bottom ledge 382 and the bottom annular surface 332 of the integral flange 318) and the axially-oriented bottom braking surface 354 of the bottom ledge 382. The partitions 384 may be straight or curved. And the vanes 386 defined in the bottom ledge 382 form an open, circumferential vane access channel 388 that divides the transverse cheek edge surface 346 into a top transverse cheek edge surface 390 and a bottom transverse cheek edge surface 392. The vanes 386 may extend radially inwardly from the transverse cheek edge surface 346 either partly through the bottom ledge 382 or, alternatively, all the way through the bottom ledge 382 such that an inner circumferential edge surface 394 includes a corresponding open, circumferential vane access channel (not shown). Air contained in the vanes 386 during rotation of the brake rotor 300 is centrifugally expelled through the open, circumferential vane access channel 388 and helps dissipate the heat generated at the top and bottom braking surfaces 352, 354 during braking.

Figure 4:
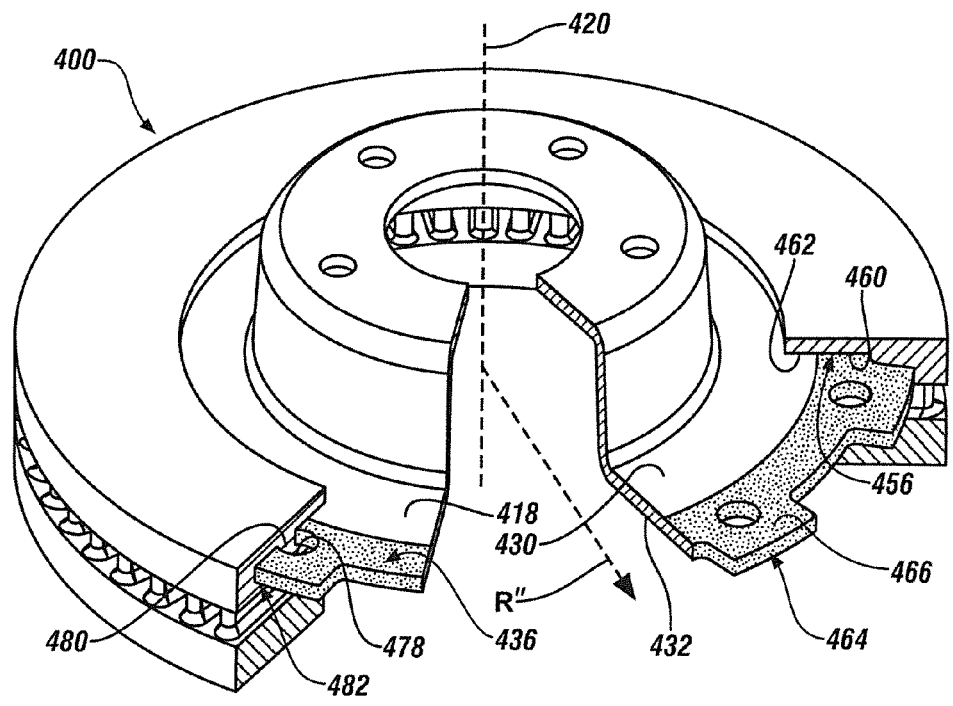
FIG. 4 is a perspective, partially cut-away view of a sound-damped brake rotor according to still another embodiment of the invention in which mechanical locking features are present to secure the annular rotor cheek to the rotor hat and a vented ledge forms part of the annular rotor cheek.

FIG. 4 illustrates a brake rotor 400 according to yet another particular design. This particular brake rotor 400 includes both the mechanical locking features incorporated into the second-described brake rotor 200 and the vented bottom ledge incorporated into the third-described brake rotor 300. The brake rotor 400 of this embodiment, for instance, includes an edge surface 464 of the integral flange 418 that exhibits a variable radius R" about the longitudinal axis 420, a plurality of holes 478 that are circumferentially spaced around the peripheral radial segment 436 and extend through the integral flange 418 from the top annular surface 430 to the bottom annular surface 432, and a vented bottom ledge 482. Each of those features is fully described above and their descriptions are not repeated here for the sake of brevity. The brake rotor 400 shown here does, however, include a bonded interface 462 at the top annular interfacial boundary 456 radially inward of the vibration damping interface 460 (as well as the bottom annular facial boundary if desired) even though the mechanical locking features (tabs 466 and holes 478/studs 480) are present.

Any of the brake rotors 100, 200, 300, 400 previously disclosed may be manufactured by the method schematically illustrated in FIGS. 5-10. This method generally comprises a rotor hat forming step, a non-wettable coating application step, and a rotor cheek casting step. Other manufacturing steps may be performed either before, during, or after these three steps as is generally understood by skilled artisans. The differences between the various brake rotors 100, 200, 300, 400 can be easily accommodated by modifying the rotor hat forming step and/or the rotor cheek casting step. A generalized brake rotor construction denoted by reference numeral 500, which is intended to encompass each of these brake rotors 100, 200, 300, 400 described above, is therefore depicted in FIGS. 5-10 for the sake of simplicity. Like numerals are used in the generalized brake rotor 500 to refer to like aspects of the brake rotors 100, 200, 300, 400 previously discussed. Other brake rotors besides the ones specifically illustrated in FIGS. 1-4 may of course be manufactured by the same method.

Figure 5:
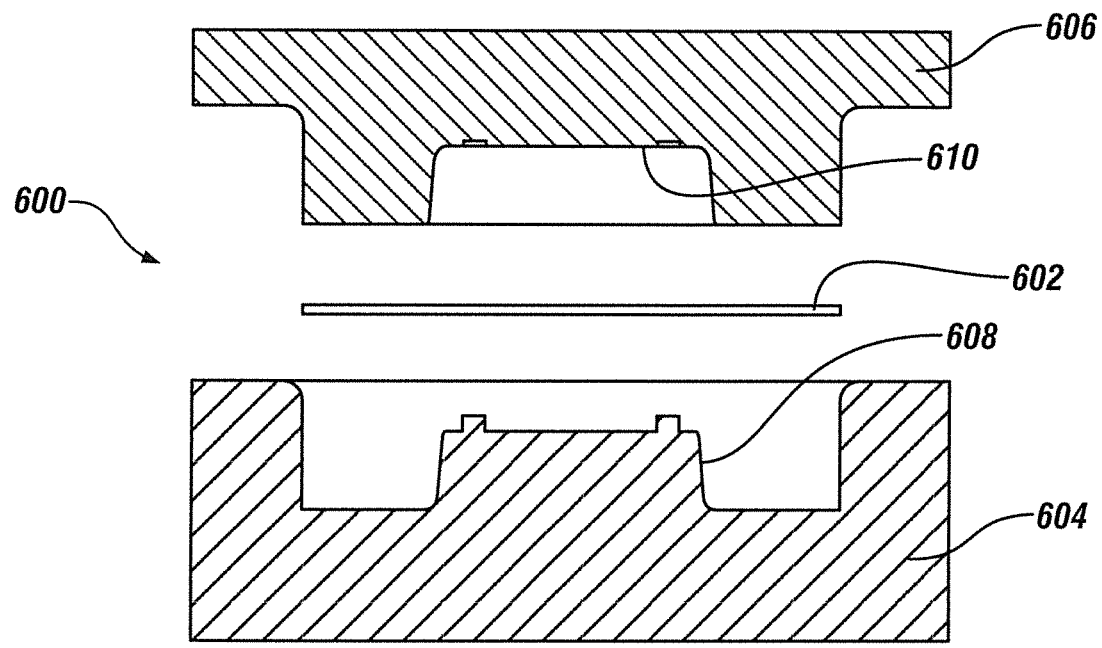
FIGS. 5-6 illustrate an embodiment of a rotor hat forming step as part of a method for manufacturing the sound-damped brake rotor.
Figure 6:
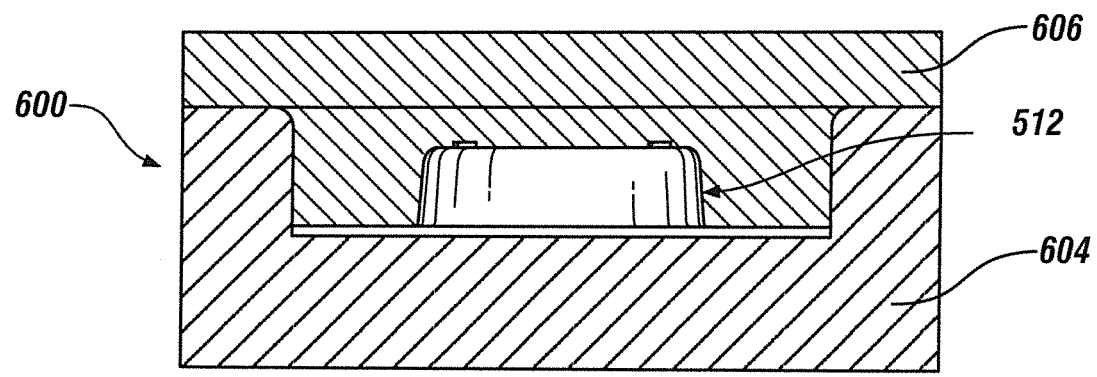

The rotor hat forming step, as shown in FIGS. 5-6, involves forming the rotor hat 512, for example, in a stamping press 602, from a thin steel sheet 602 of suitable size and thickness. The stamping press 602 includes a lower die block 604 and an upper die block 606. The lower die block 604 has a lower die block surface 608 and the upper die block 606 has a complimentary upper die block surface 610 which, together, are used to deform the thin steel sheet 602. Each of the lower die block surface 608 and the upper die block surface 610 are preferably formed from a hard tool alloy. A dry or liquid lubricant may be applied to either or both of the thin steel sheet 602 and the die block surfaces 608, 610 before stamping to prevent material buildup on the die block surfaces 608, 610 and the associated marring of a subsequently stamped thin steel sheet 602.

The thin steel sheet 602 is first placed between the lower die block surface 608 and the upper die block surface 610 when the lower and upper die blocks 604, 606 are separated (FIG. 5). A series of guides or other related positioning elements hold the thin steel sheet 602 in place at the correct location. An applied force—usually pneumatic or hydraulic—is then directed at either the lower die block 604, the upper die block 606, or both, to bring the die blocks 604, 606 together and press the lower die block surface 608 and the upper die block surface 610 against opposed faces of the thin steel sheet 602 (FIG. 6). The pressed engagement of the die block surfaces 608, 610 stamps the thin steel sheet 602 into the rotor hat 512. Any of the bore 526, the bolt holes 528, or the mechanical locking holes 578 can be formed within the stamping press 600 by encroachment of the lower and upper die surfaces 608, 610 or they may be separately formed outside of the stamping press 600 by drilling or another suitable procedure.

Figure 7:
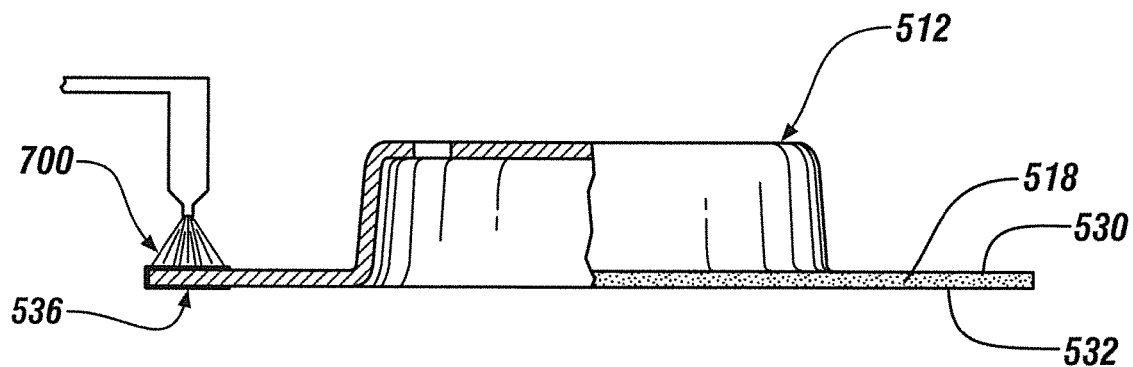
FIG. 7 illustrates an embodiment of a non-wettable coating application step as part of a method for manufacturing the sound-damped brake rotor.

The non-wettable coating application step, as shown in FIG. 7, is performed after the rotor hat 512 is removed from the stamping press 600. Any suitable coating technique may be employed to apply the non-wettable coating composition 700 to the peripheral radial segment 536 of the top annular surface 530, the bottom annular surface 532, or both, of the integral flange 518. Spraying, brushing, dipping, doctor blading, slot die coating, and comma bar coating are just some of the coating techniques that may be used. The applied non-wettable coating composition 700 may be afforded drying time or subjected to heat or another curing facilitator, depending on its specific composition, in order to harden it into the non-wettable coating. A single coating application or several coating applications may be performed at the peripheral radial segment 536 depending on the precision of the coating technique utilized.

Figure 8:
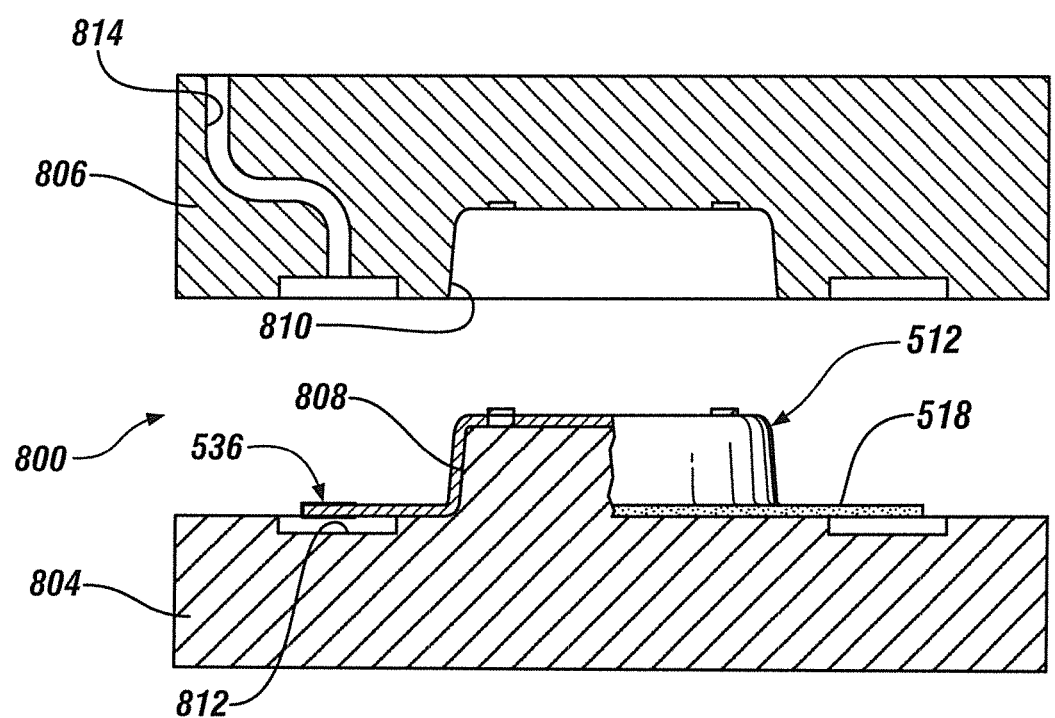
FIGS. 8-9 illustrate an embodiment of a rotor cheek casting step as part of a method for manufacturing the sound-damped brake rotor.
Figure 9:
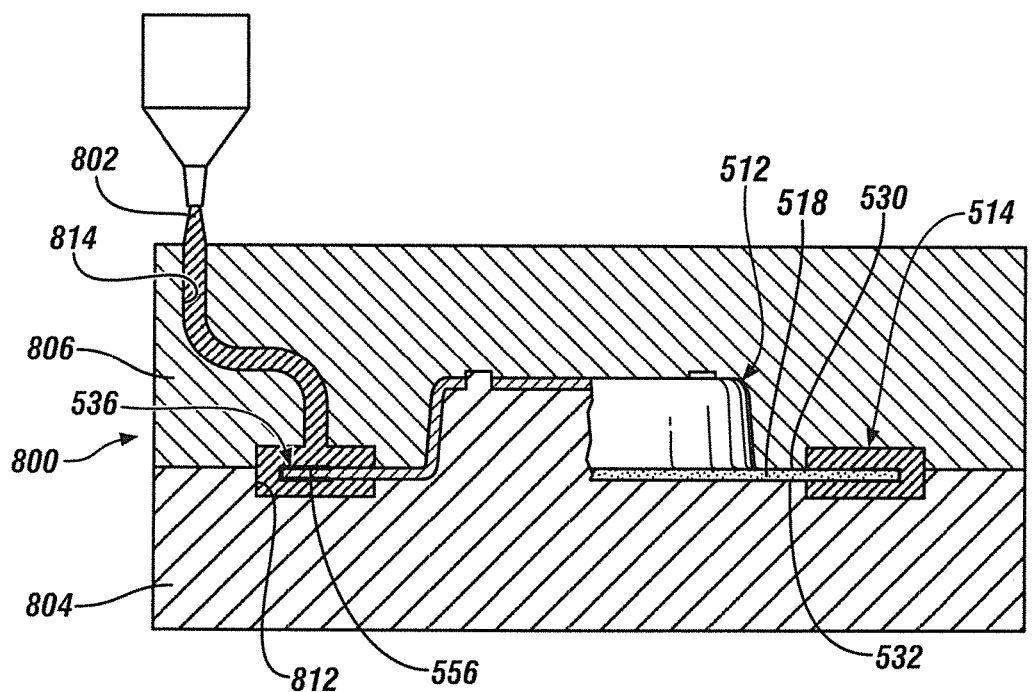
Figure 10:
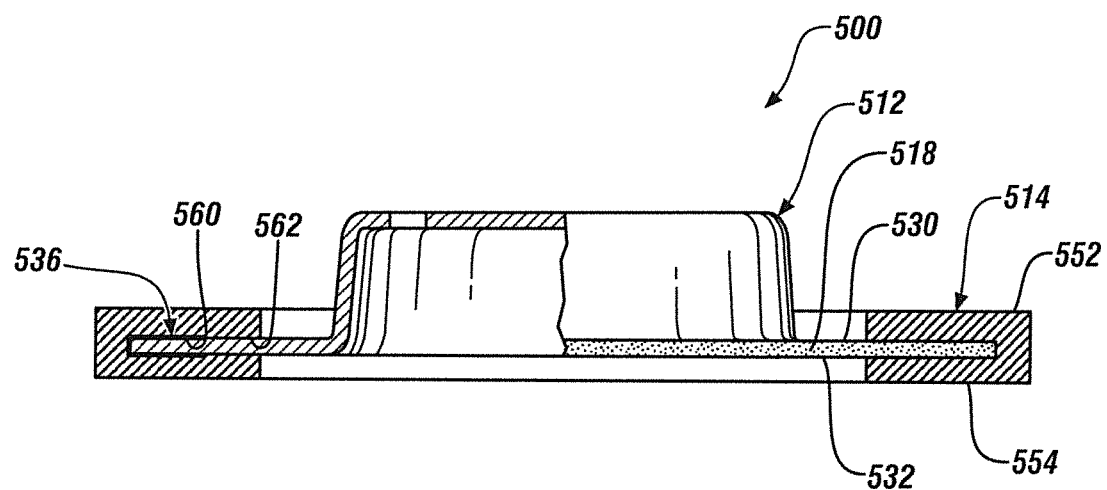
FIG. 10 illustrates a partial cross-sectional view of a generalized sound-damped brake rotor formed according to the method depicted in FIGS. 5-9.

The rotor cheek casting step, as shown in FIGS. 8-10, involves casting the rotor cheek 514 around the integral flange 518 of the rotor hat 512 and over the non-wettable coating applied at the peripheral radial segment 536. A casting mold 800 is used to distribute and solidify a molten cast iron charge 802 around the integral flange 518 in the intended shape (solid, vented, etc.). The casting mold 800 includes a lower die member 804 and an upper die member 806. The lower die member has a lower die member surface 808 and the upper die member has a complimentary upper die member surface 810 that, when brought together and sealed, define a mold cavity 812 which emulates the desired shape of the annular rotor cheek 514. A charge inlet 814 that communicates with the mold cavity 812 is present in the casting mold 800 for the purpose of delivering the molten cast iron charge 802. The casting mold 800 may be any suitable type of expendable or non-expendable molding structure including, for example, a sand casting mold, a plaster casting mold, a permanent casting mold, or a die casting mold. These types of casting molds as well as many others are well understood by skilled artisans and need not be further described here.

The lower die member 804 and the upper die member 806 are separated to provide access for the rotor hat 512 after the application of the non-wettable coating to the integral flange 518. The rotor hat 512 is then situated between the lower die member 804 and the upper die member 806 and aligned with respect to the opposed complimentary die member surfaces 808, 810. After the rotor hat 512 is correctly positioned, the lower die member 804 and the upper die member 806 are closed. The lower die member surface 808 and the upper die member surface 810 surround the rotor hat 512 and form the sealed molding cavity 812. A portion of the integral flange 518 representing the annular interfacial boundary 556 on the top annular surface 530 and a similar (but not necessarily corresponding) annular interfacial boundary on the bottom annular surface 532 are exposed in the mold cavity 812. The molten cast iron charge 802 is then introduced into the mold cavity 812 through the charge inlet 814 under ambient pressure or vacuum. The molten cast iron floods the mold cavity 812 and accumulates around the integral flange 518. Eventually the molten cast iron solidifies into the rotor cheek 514 through ambient or assisted cooling in the mold cavity 812.

The brake rotor 500 is removed from the casting mold 800 after the annular rotor cheek 514 has solidified to the desired extent. Any additional machining or refinishing still required of the brake rotor 500 may now be accomplished. The brake rotor 500 manufactured by this process is light weight, on account of the steel rotor hat 512 and the less overall use of cast iron, and sound damped, on account of the vibration damping interface 560 formed between the integral flange 518 of the rotor hat 512 and the rotor cheek 514. The brake rotor 500 thus contributes less weight to the vehicle braking system than conventional cast iron brake rotors and, additionally, disrupts the vibration propagation that may develop from braking events that selectively press closely-situated brake pads against the braking surfaces 552, 554 of the annular rotor cheek 514 during a wide range of driving conditions.

The above description of preferred exemplary embodiments is merely descriptive in nature and not intended to limit the scope of the claims that follow. Certain terms such as "top," "bottom," "upper," and "lower" have been used to describe the several disclosed exemplary brake rotor embodiments in accordance with their associated drawing Figures. These terms are not meant to impose design or use restrictions on the brake rotors; rather, they are merely relative terms that have been employed given the orientation of the drawing Figures. Each of the terms used in the appended claims should be given its ordinary and customary meaning unless specifically stated otherwise in the specification.

The invention claimed is:

1. A sound-damped brake rotor, for a vehicle braking system, that co-rotates with a vehicle wheel in close relationship to one or more brake pads that can be selectively applied against the brake rotor to slow the rotational speed of the wheel, the brake rotor comprising:
    a rotor hat made of steel that comprises an axially-protruding central hub along a longitudinal axis of the rotor hat and an integral flange that extends radially from and circumferentially around the central hub, the integral flange having a top annular surface and a bottom annular surface connected by an edge surface across a thickness of the integral flange, and at least one of the top annular surface or the bottom annular surface, or both, comprising a peripheral radial segment; and
    an annular rotor cheek made of cast iron that surrounds and is supported by the rotor hat, the rotor cheek comprising a top ledge that overlies the top annular surface of the integral flange and a bottom ledge that overlies the bottom annular surface of the integral flange, at least one of the top ledge or the bottom ledge providing an axially-oriented braking surface against which an associated brake pad can be selectively applied, the top ledge further having an underside that forms a top annular interfacial boundary with the top annular surface of the integral flange and the bottom ledge further having an underside that forms a bottom annular interfacial boundary with the bottom annular surface of the integral flange, and wherein at least one of the top annular interfacial boundary or the bottom annular interfacial boundary comprises (1) a non-wettable coating at the peripheral radial segment where relative frictional contacting movement occurs when vibrations are imparted to the rotor cheek, the non-wettable coating including a refractory component dispersed in a binder, and (2) a bonded interface radially inward of the non-wettable coating where a metallurgically fused interfacial joint is present.

2. The sound-damped brake rotor of claim 1, wherein the edge surface of the integral flange maintains a constant radius about the longitudinal axis, and wherein the top ledge and the bottom ledge transition around the edge surface of the integral flange to provide a transverse cheek edge surface that defines a radius and circumference of the rotor cheek.

3. The sound-damped brake rotor of claim 1, wherein each of the top annular interfacial boundary and the bottom annular interfacial boundary includes a bonded interface radially inward of a non-wettable coating.

4. The sound-damped brake rotor of claim 3, wherein each of the top ledge and the bottom ledge extends radially inwardly from the transverse cheek edge surface to a top inner circumferential edge surface and a bottom inner circumferential edge surface, respectively, and wherein the top inner circumferential edge surface defines an annular gap with a side wall of the axially-protruding central hub.

5. The sound-damped brake rotor of claim 1, wherein the edge surface of the integral flange maintains a variable radius about the longitudinal axis.

6. The sound-damped brake rotor of claim 5, wherein the integral flange includes a plurality of circumferentially spaced tabs that extend radially outwardly from a nominal edge surface of the integral flange to an extended edge surface of the integral flange, and wherein a plurality of spaces located between the tabs receive a corresponding portion of the annular rotor cheek.

7. The sound-damped brake rotor of claim 1, wherein the integral flange includes a plurality of holes circumferentially spaced around the peripheral radial segment that extend through the integral flange from the top annular surface to the bottom annular surface, and wherein each of the plurality of holes receives a stud of cast iron which integrally joins the top ledge to the bottom ledge.

8. The sound-damped brake rotor of claim 1, wherein at least one of the top ledge or the bottom ledge includes a plurality of circumferentially spaced partitions that define vanes which extend radially inwardly into the top ledge or the bottom ledge from an open, circumferential vane access channel located at a transverse cheek edge surface that defines a radius and circumference of the rotor cheek.

9. The sound-damped brake rotor of claim 8, wherein each of the top ledge and the bottom ledge extends radially inwardly from the transverse cheek edge surface to a top inner circumferential edge surface and a bottom inner circumferential edge surface, respectively, and wherein the vanes extend radially inwardly from the circumferential vane access channel all the way through the top ledge or the bottom ledge to the top inner circumferential edge surface or the bottom inner circumferential edge surface.

10. The sound-damped brake rotor of claim 1, wherein the refractory component comprises at least one of graphite, alumina, silica, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, vermiculite, kaolinite, muscovite, a fire clay, or a mixture thereof.

11. The sound-damped brake rotor of claim 1, wherein the binder comprises an epoxy resin, a vinyl ester resin, a lignosulfonate binder, a calcium aluminate cement, a wood flour cement, or a mixture thereof.

12. A method of manufacturing a sound-damped brake rotor that co-rotates with a vehicle wheel in close relationship to one or more brake pads that can be selectively applied against the brake rotor to slow the rotational speed of the wheel, the method comprising:
  forming a rotor hat made from steel that comprises an axially-protruding central hub along a longitudinal axis of the rotor hat and an integral flange that extends radially from and circumferentially around the central hub, the integral flange having a top annular surface and a bottom annular surface connected by an edge surface that defines a thickness of the integral flange;
  applying a non-wettable coating to a peripheral radial segment of the top annular surface, the bottom annular surface, or both, of the integral flange; and
  casting an annular rotor cheek made of iron around the integral flange of the rotor hat, the annular rotor cheek having a top ledge that overlies the top annular surface of the integral flange and a bottom ledge that overlies the bottom annular surface of the integral flange, the top ledge further having an underside that forms a top annular interfacial boundary with the top annular surface of the integral flange and the bottom ledge further having an underside that forms a bottom annular interfacial boundary with the bottom annular surface of the integral flange, and wherein at least one of the top annular interfacial boundary or the bottom annular interfacial boundary comprises a vibration damping interface at the peripheral radial segment where the non-wettalble coating is present, the vibration damping interface permitting relative frictional contacting movement to occur when vibrations are imparted to the rotor cheek.

13. The method of claim 12, wherein forming the rotor hat comprises:
  situating a thin steel sheet of a suitable size and thickness into a stamping press that includes a lower die block having a lower die block surface and an upper die block having an upper die block surface; and
  bringing the lower die block and the upper die block together so that the lower die block surface and the upper die block surface contact opposed surfaces of the thin steel sheet and stamp the thin steel sheet into the rotor hat.

14. The method of claim 12, wherein applying the non-wettable coating comprises:
  applying a non-wettable coating composition to the peripheral radial segment, the non-wettable coating composition comprising a refractory component and a binder; and
  hardening the non-wettable coating composition into the non-wettable coating.

15. The method of claim 14, wherein the refractory component comprises at least one of graphite, alumina, silica, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, vermiculite, kaolinite, muscovite, a fire clay, or a mixture thereof, and wherein the binder comprises an epoxy resin, a vinyl ester resin, a lignosulfonate binder, a calcium aluminate cement, a wood flour cement, or a mixture thereof.

16. The method of claim 12, wherein casting the annular rotor cheek comprises:
  situating the rotor hat, already having the non-wettable coating applied, between a lower die member that has a lower die member surface and an upper die member that has an upper die member surface;
  bringing the lower die member and the upper die member together so that the lower die member surface and the upper die member surface define a mold cavity around the rotor hat complimentary in shape to the annular rotor cheek;
  introducing a molten cast iron charge into the mold cavity around the integral flange and over the peripheral radial section that includes the non-wettable coating; and
  solidifying the molten cast iron in the mold cavity into the annular rotor cheek.

17. The method of claim 12, wherein casting the annular rotor cheek comprises at least one of the following to support the rotor cheek on the rotor hat and prevent relative independent rotational movement between the rotor cheek and the rotor hat:
  a) forming a bonded interface at the top annular interfacial boundary or the bottom annular interfacial boundary, the bonded interface comprising a metallurgically fused interfacial joint that forms between the underside of the top ledge and the top annular surface of the integral flange or the bottom ledge and the bottom annular surface of the integral flange;
  b) forming the rotor cheek around the edge surface of the integral flange when the edge surface has a variable radius about the longitudinal axis of the rotor hat; or
  c) forming a plurality of studs that are received through a plurality of circumferentially spaced holes located around the peripheral radial segment and which extend through the integral flange from the top annular surface to the bottom annular surface, the plurality of studs integrally joining the top ledge and the bottom ledge.

18. A method of manufacturing a sound-damped brake rotor that co-rotates with a vehicle wheel in close relationship to one or more brake pads that can be selectively applied against the brake rotor to slow the rotational speed of the wheel, the method comprising:
  forming a steel rotor hat that includes an integral flange concentric with a longitudinal axis of the rotor hat, the integral flange having a top annular surface and a bottom annular surface, at least one of the top annular surface or the bottom annular surface having a peripheral radial segment;

applying a non-wettable coating to the peripheral radial segment of the integral flange, the non-wettable coating being derived from a non-wettable coating composition that comprises a refractory component and a binder; and casting an annular rotor cheek made of cast iron around the integral flange of the rotor hat, the annular rotor cheek having a ledge that overlies the peripheral radial segment and forms a vibration damping interface with the non-wettable coating applied to the peripheral radial segment and a bonded interface with the integral flange where the non-wettable coating is not applied, wherein the vibration damping interface permits relative frictional contacting movement to occur between the ledge and the non-wettable coating when vibrations are imparted to the rotor cheek, and wherein the bonded interface metallurgically fuses the ledge of the annular cheek to the integral flange.

\* \* \* \* \*